(12) United States Patent
Nakamura

(10) Patent No.: US 6,346,758 B1
(45) Date of Patent: Feb. 12, 2002

(54) ROTARY ELECTRIC MACHINE AND METHOD OF MANUFACTURING THE SAME

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 39 days.

(21) Appl. No.: 09/592,613

(22) Filed: Jun. 12, 2000

(30) Foreign Application Priority Data

Jul. 12, 1999 (JP) .............................. 11-197366

(51) Int. Cl.[7] .............................. H02K 1/16; H02K 5/04
(52) U.S. Cl. .................. 310/217; 310/216; 310/215; 310/42; 310/254
(58) Field of Search .................. 310/42, 215, 216, 310/217, 218, 254; 29/596

(56) References Cited

U.S. PATENT DOCUMENTS

| | | | | |
|---|---|---|---|---|
| 4,264,663 A | * | 4/1981 | Beenken | 310/217 X |
| 5,998,903 A | | 12/1999 | Umeda et al. | 310/179 |
| 6,208,060 B1 | * | 3/2001 | Kusase et al. | 310/254 |

* cited by examiner

*Primary Examiner*—Nestor Ramirez
*Assistant Examiner*—Judson H. Jones
(74) *Attorney, Agent, or Firm*—Pillsbury Winthrop LLP

(57) ABSTRACT

In a rotary electric machine such as a vehicle AC generator, each slot of a stator core has chamfered corners extending over a distance longer than thickness of the core sheet and burrs extending from the core sheet in one direction so that the chamfered corners and burrs join the core sheet of adjacent layers together.

14 Claims, 4 Drawing Sheets

ROTARY ELECTRIC MACHINE AND METHOD OF MANUFACTURING THE SAME

CROSS REFERENCE TO RELATED APPLICATION

The present application is based on and claims priority from Japanese Patent Application Hei 11-197366 filed on Jul. 12, 1999, the contents of which are incorporated herein by reference.

BACKGROUND OF THE INVENTION

1. Field of the Invention

The present invention relates to a rotary electric machine and a method of manufacturing the same, particularly, a stator core of the rotary electric machine.

2. Description of the Related Art

WO98/54823 discloses a rotary electric machine, in which conductor segments are inserted into slots of a stator core in the axial direction of the stator core. The stator core is formed from an iron core sheet laminated into a plurality of layers. The iron core sheet is usually thicker than 0.5 mm.

Although a thinner core sheet is more preferable to decrease an eddy current loss, it becomes more difficult to manufacture. Thin core sheet is easy to deform and difficult to reduce burrs on the sheared corners if it is press-formed.

Such burrs may damage an insulation structure of a rotary machine unless any appropriate arrangement is made.

SUMMARY OF THE INVENTION

A main object of the invention is to provide an improved arrangement of a rotary electric machine which is resistant to deformation force.

Another object of the invention is to provide a simple and reliable insulation structure of a rotary electric machine.

Another object of the invention is to provide an improved method of manufacturing such a simple and reliable rotary electric machine.

In a rotary electric machine according to a main feature of the invention, each slot has chamfered corners extending from opposite ends of the stator core over a distance longer than a thickness of the core sheet that forms a multi-layered stator core to engage another layer of the core sheet.

Accordingly, edges of burrs of a core sheet of one layer is bent inward to engage a side edge of the core sheet of the adjacent layer, so that the layers of the core sheet can be prevented from being peeled off. This structure also prevents insulators from being damaged.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
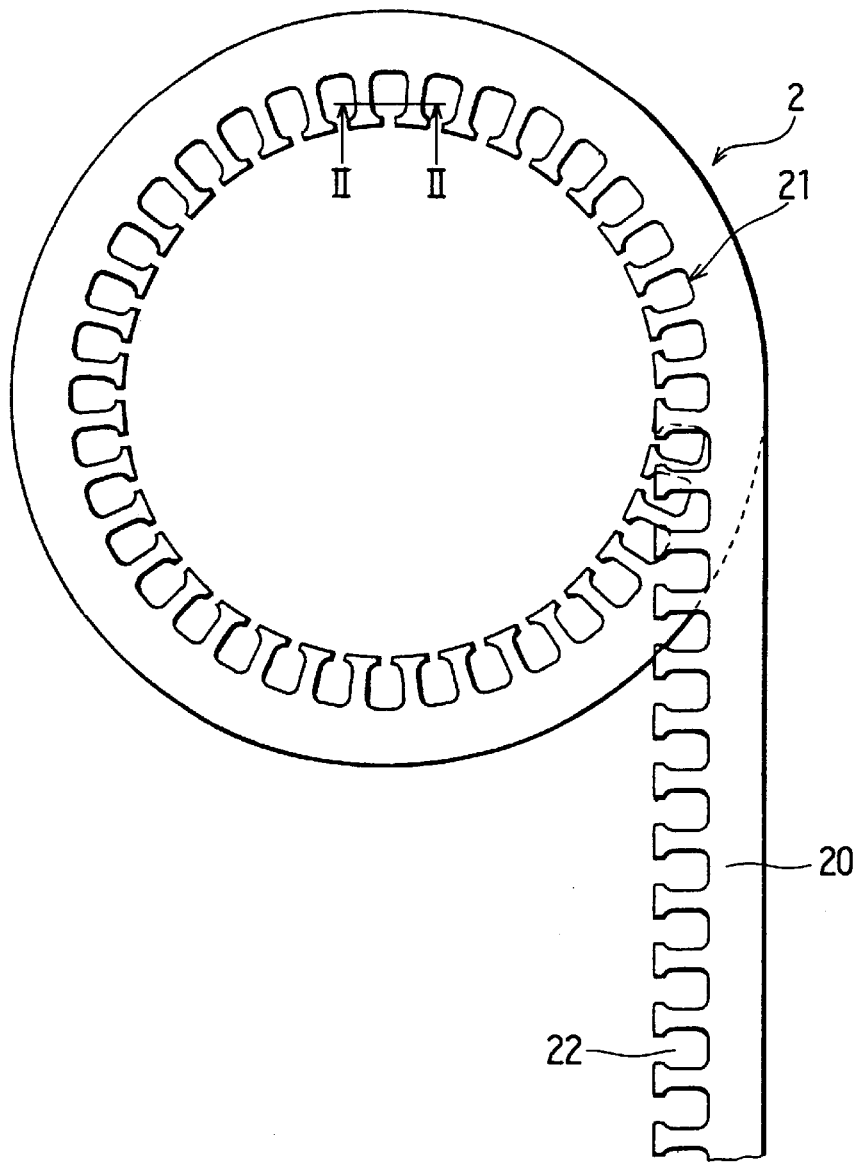
FIG. 1 is a plan view illustrating a step of forming a stator core of a rotary electric machine according to a preferred embodiment of the invention.
Figure 2:
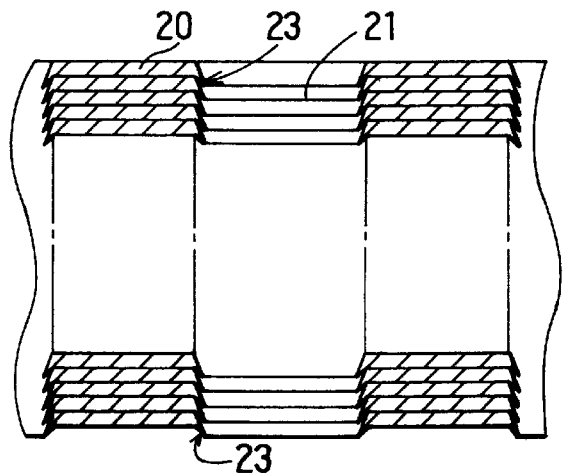
FIG. 2 is a fragmentary cross-sectional view of the stator core cut along line II—II in FIG. 1.

As shown in FIG. 1, stator core 2 of a rotary electric machine according to a preferred embodiment of the invention, such as a vehicle AC generator, is formed from a 0.35 mm-thick strip of iron core sheet 20, which is coiled and laminated into a plurality of layers. Stator core 2 has a plurality of slots 21 at the inner periphery thereof at circumferentially equal intervals.

Figure 3:
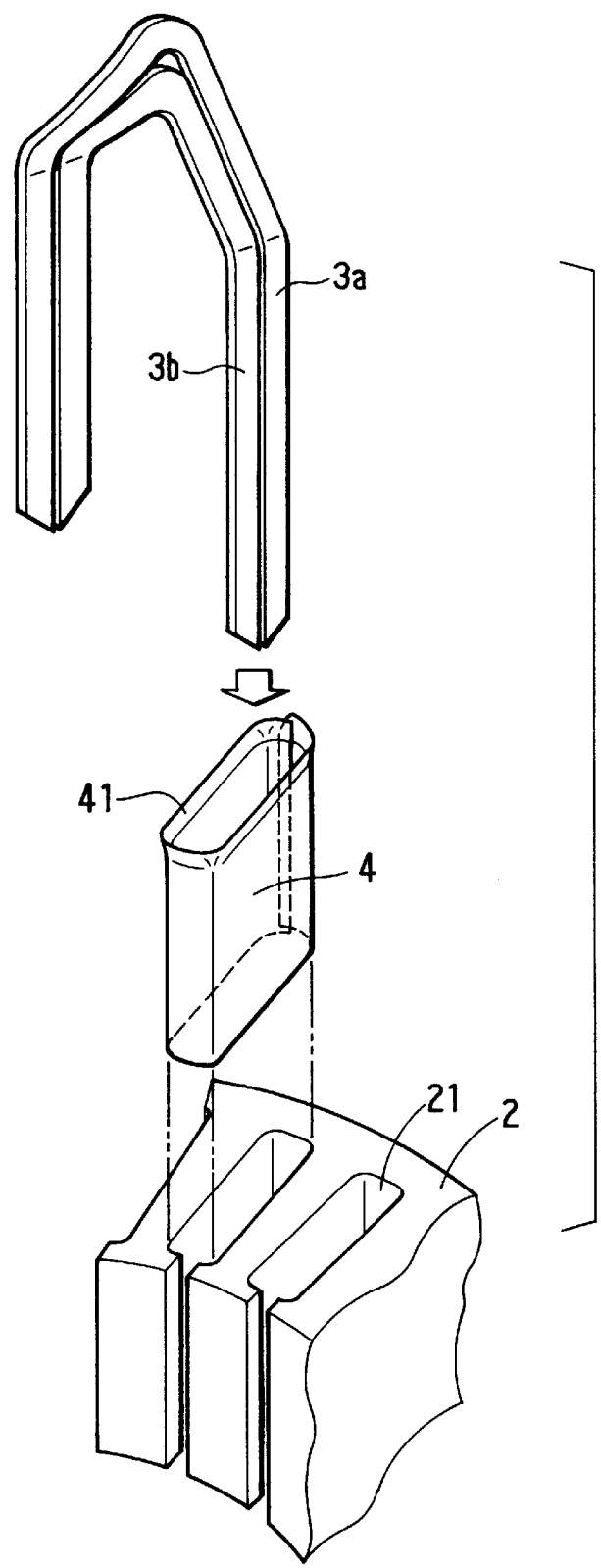
FIG. 3 is an exploded perspective view illustrating a step of inserting a conductor segment into the stator core according to the preferred embodiment.
Figure 4:
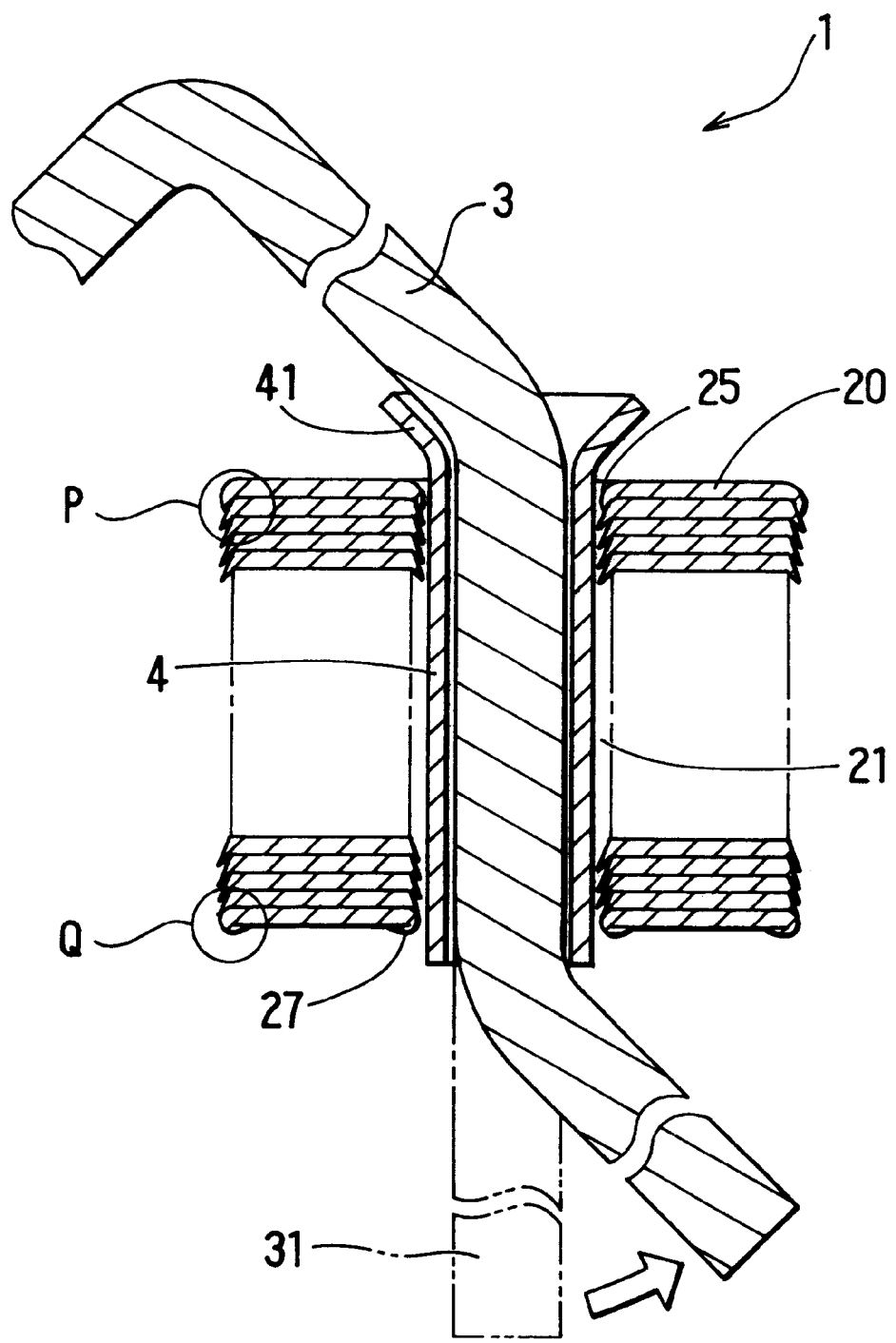
FIG. 4 is a fragmentary schematic view of the stator core according to the preferred embodiment with the conductor segment being inserted therein.

As shown in FIGS. 3 and 4, a stator winding is formed from a plurality of pairs of insulation-film-coated conductor segments 3a, and 3b, which are inserted into slots 21 to be covered with insulators 4, bent and welded to one another in a prescribed manner. Each insulator 4 has upwardly spreading skirt portion 41. Skirt portion 41 prevents insulator 4 from being dragged by conductor segments 3a and 3b when those are inserted into slot 21.

As shown in FIG. 1, a plurality of slot holes 22 are punched in iron core sheet 20 before it is coiled and laminated. Core sheet 20 is coiled and laminated so that burrs extend in the same direction. After core sheet 20 has been laminated to a prescribed number of layers to form a cylindrical core, the outer periphery thereof is welded at a plurality of portions to fix together.

Thereafter, internal corner of each slot 21 of the cylindrical core is pressed by a tool to form chamfers extending over a distance longer than the thickness of core sheet 20. As a result, each slot 21 has smooth corner surfaces with the above described burrs bent radially inward to engage with the side edge of core sheet 20 of the adjacent layer.

Figure 5:
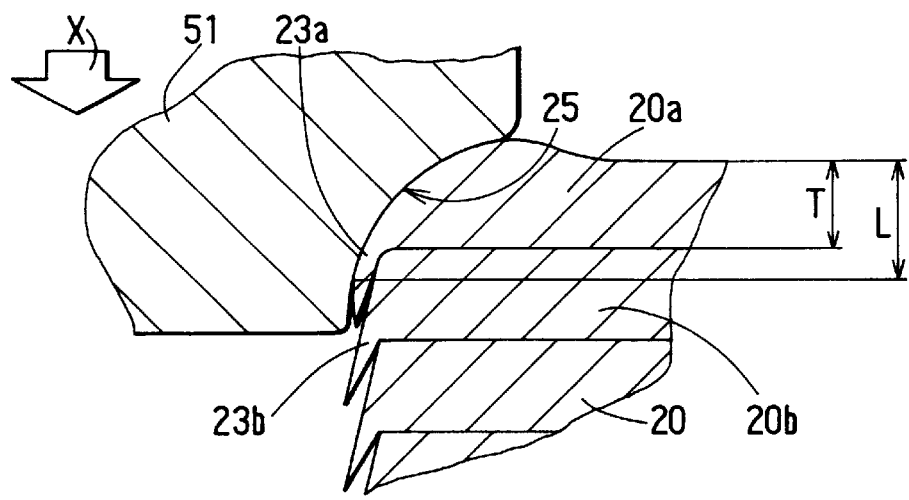
FIG. 5 is a schematic diagram illustrating a step of chamfering according to the preferred embodiment.
Figure 7:
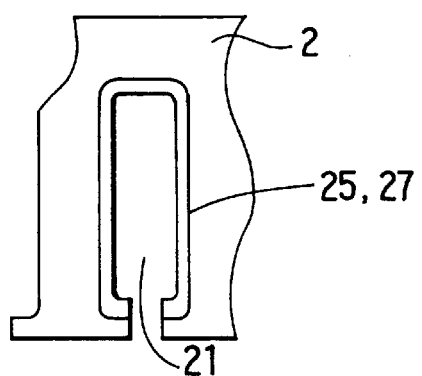
FIG. 7 is a schematic diagram illustrating a chamfered portion of the stator core according to the preferred embodiment.

As illustrated in FIGS. 5 and 7, chamfering tool 51 is inserted into each slot 21 from the upper side of the core in the direction designated by arrow X and pressed against the upper corner of slot 21 so that chamfer 25 extends over distance L that is longer than thickness T (e.g. 0.35 mm) of core sheet 20a in the uppermost layer or core sheet 20b of the second layer. Accordingly, edge of the burr 23a is bent radially inward to engage and press the side edge of core sheet 20b of the second layer so that another burr 23b presses core sheet 20 of the third layer.

Figure 6:
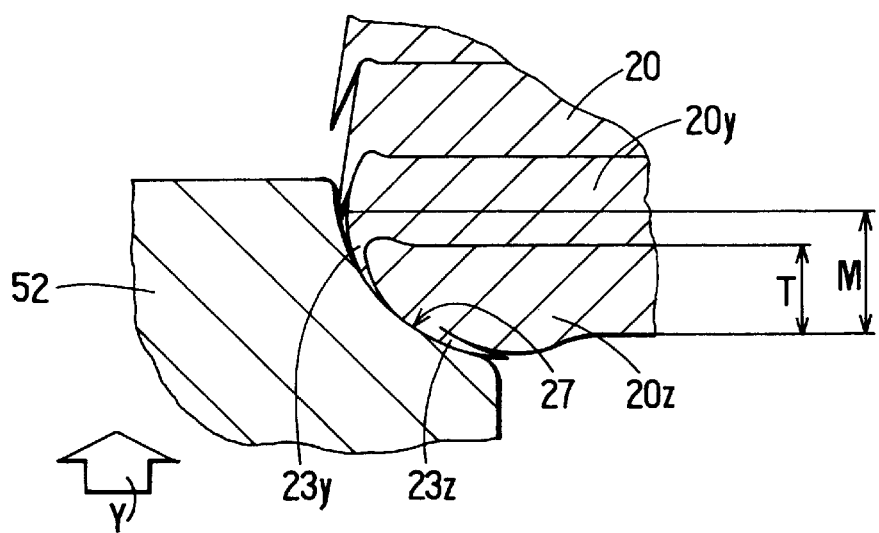
FIG. 6 is a schematic diagram illustrating a step of chamfering according to the preferred embodiment.

As illustrated in FIGS. 6 and 7, chamfering tool 52 is inserted into each slot 21 from the lower side of the core in the direction designated by arrow Y and pressed against the lower corner of slot 21 so that chamfer 27 extends over distance M that is longer than thickness T of core sheet 20z of the lowermost layer. Burr 23y extending from adjacent core sheet 20y is also chamfered and bent to engage the side edge of core sheet 20z.

It is preferable that the above-described chamfering steps are carried out concurrently to prevent the core from deforming.

Distance L or M of the chamfer can be extended to longer than 2T to join three or more layers of core sheet 20 together.

Thus, conductor segments 3a and 3b and insulators 4 can be inserted into slots 21 smoothly so that the layers of core sheet 20 can be prevented from being peeled off or damaged. This also prevents insulators 4 from being damaged.

The above chamfering steps can be applied to a stator core comprised of a plurality of separate core sheets.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A rotary electric machine comprising:

a rotor; and a stator having a stator core and stator winding disposed opposite said rotor, said stator core being formed of a plurality of layers of a core sheet and having a plurality of slots, wherein each said slot has chamfered corners extending over a distance longer than the thickness of said core sheet and burrs extending from said core sheet of said plurality of layers in one direction at opposite ends of said stator core so that said chamfered corners and said burrs join said core sheet of adjacent layers together.

2. The rotary electric machine as claimed in claim 1, wherein at least two layers of said core sheet are joined by said chamfered corners.

3. The rotary electric machine as claimed in claim 1, wherein said stator winding comprises a plurality of conductor segments welded to one another.

4. The rotary electric machine as claimed in claim 3, wherein said core sheet is stamped out in a direction and said conductor segments are inserted into said slots in the same direction as said direction in which said core sheet is stamped out.

5. The rotary electric machine as claimed in claim 1, wherein an insulator is disposed between each said slot and said stator winding.

6. The rotary electric machine as claimed in claim 5, wherein said stator winding has insulation coating.

7. The rotary electric machine as claimed in claim 1, wherein a plurality of said layers of said core sheet are joined to each other removed from said chamfered corner.

8. A rotary electric machine comprising a stator core having a plurality of layers of a core sheet, wherein said stator core has chamfered corners extending over a distance longer than the thickness of said core sheet and burrs extending from said plurality of layers in one direction at opposite ends thereof so that said chamfered corners and said burrs join said core sheet of adjacent layers together.

9. The rotary electric machine as claimed in claim 8, wherein at least two layers of said core sheet are joined by said chamfered corner and said burrs.

10. The rotary electric machine as claimed in claim 9, wherein said chamfered corner of one layer of said core sheet covers a side edge of the next layer of said iron core sheet.

11. A method of manufacturing a stator of a rotary electric machine comprising the steps of:

laminating an iron core sheet having a prescribed thickness in one direction to form a stator core; and pressing corners of said stator core to form chamfered corners to extend over a distance longer than said prescribed thickness so that said chamfered corners join said core sheet of adjacent layers together.

12. A method of manufacturing a stator of a rotary electric machine comprising the steps of:

laminating a core sheet having a prescribed thickness in one direction to form a stator core having a plurality of slots; and pressing corners of said plurality of slots to form chamfered corners extending over a distance longer than said prescribed thickness so that said chamfered corners join said core sheet of adjacent layers together.

13. A method of manufacturing a stator of a rotary electric machine comprising the steps of:

press-forming a iron core sheet having a prescribed thickness:

laminating said iron core sheet into a plurality of layers to form a stator core; and pressing corners of said stator core to form chamfered corners extending over a distance longer than said prescribed thickness so that said chamfered corners join said core sheet of adjacent layers together.

14. A method of manufacturing a stator of a rotary electric machine comprising the steps of:

press-forming a iron core sheet having a prescribed thickness:

laminating said iron core sheet into a plurality of layers to form a stator core having a plurality of slots; and pressing corners of said plurality of slots to form chamfers extending over a distance longer than said prescribed thickness.

* * * * *